(12) United States Patent
Kurita et al.

(10) Patent No.: US 6,968,562 B2
(45) Date of Patent: Nov. 22, 2005

(54) RECORDING AND/OR REPRODUCING APPARATUS

(75) Inventors: Kazuhito Kurita, Kanagawa (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 10/421,767

(22) Filed: Apr. 24, 2003

(65) Prior Publication Data

US 2003/0218964 A1 Nov. 27, 2003

(30) Foreign Application Priority Data

May 15, 2002 (JP) .......................... P2002-140592

(51) Int. Cl.[7] ............................................... G11B 7/08
(52) U.S. Cl. ...................................................... 720/663
(58) Field of Search .......................... 369/219; 359/821, 359/824; 198/705.1; 720/616, 663; 310/328

(56) References Cited

U.S. PATENT DOCUMENTS

| | | | |
|---|---|---|---|
| 5,225,941 A | | 7/1993 | Saito et al. |
| 5,675,444 A | * | 10/1997 | Ueyama et al. ............. 359/824 |
| 5,812,511 A | * | 9/1998 | Kawamura et al. ......... 720/616 |
| 6,134,057 A | * | 10/2000 | Ueyama et al. ............. 359/821 |
| 6,188,161 B1 | * | 2/2001 | Yoshida et al. ............. 310/328 |
| 6,337,840 B1 | | 1/2002 | Nakamura et al. |
| 6,515,954 B1 | | 2/2003 | Nakamura et al. |
| 6,662,934 B1 | * | 12/2003 | Iida .......................... 198/750.1 |
| 2001/0036145 A1 | * | 11/2001 | Otani et al. ................. 369/219 |

FOREIGN PATENT DOCUMENTS

JP                06044580 A  *  2/1994

* cited by examiner

Primary Examiner—Tianjie Chen
(74) Attorney, Agent, or Firm—Oblon, Spivak, McClelland, Maier & Neustadt, P.C.

(57) ABSTRACT

A disc recorder/player that prevents foreign matter such as dust or the like from adhering to a drive shaft for assuring a highly accurate position control of the movable write and/or read unit. In the disc recorder/player, an electromechanical transducer is used as a drive source provided in a feeding mechanism for an optical pickup to expand and contract a drive shaft installed on the electromechanical transducer, and a dustproof cover unit is provided on a base to cover the top of the drive shaft. When the optical pickup supported on the drive shaft is moved, the dustproof cover unit can prevent dust, having entered when a disc cartridge is introduced into or removed from the disc recorder/player, from adhering to the drive shaft.

1 Claim, 8 Drawing Sheets

RECORDING AND/OR REPRODUCING APPARATUS

CROSS-REFERENCE TO RELATED APPLICATIONS

This document claims priority on Japanese Patent Application No. 2002-140592 filed on May 15, 2002, the entire contents of which are hereby incorporated herein by reference.

BACKGROUND OF THE INVENTION

1. Field of the Invention

The present invention relates to a recording and/or reproducing apparatus in which a recording and/or reproducing unit driven by a drive shaft is moved along the drive shaft by displacing the drive shaft by an electromechanical transducer, and the drive shaft is protected from dust or the like by a cover unit.

2. Description of the Background Art

A disc recorder/player that records or reproduces data to or from an optical disc that is a disc-shaped recording medium includes a disc rotation drive mechanism to rotate the optical disc, an optical pickup to write or read an information signal to or from the optical disc being rotatably driven by the disc rotation drive mechanism, and a pickup feeding mechanism to move the optical pickup radially along the optical disc. These components are disposed on a base of the apparatus body.

The disc rotation drive mechanism has a disc table integrally installed to a drive shaft of a spindle motor and on which an optical disc is to be placed. The optical pickup writes data to the optical disc by focusing a light beam emitted from a light source onto a signal recording layer of the optical disc through an objective lens to write data to the optical disc. The optical pickup reads data from the optical disc by detecting, from the optical disc, a return light from the optical disc (a part of the light beam focused on the signal recording layer).

The pickup feeding mechanism that feeds the above optical pickup radially along the optical disc includes a guide shaft to support the optical pickup to be movable radially along the optical disc, and a feed screw that is rotated by a drive motor to feed the optical pickup radially along the optical disc. The optical pickup is moved from the inner circumference to outer circumference of the optical disc, for example, along the guide shaft as the feed screw is rotated by the drive motor and data is written or read.

SUMMARY OF THE INVENTION

The present inventors have recognized the benefits of a disc recorder/player using an electromechanical transducer in the pickup feeding mechanism. The pickup feeding mechanism has the optical pickup installed to a drive shaft that is displaced by the electromechanical transducer, and the drive shaft is displaced by applying a ramp voltage to the electromechanical transducer. Thus, the optical pickup installed to the drive shaft can be moved along the drive shaft. Since this pickup feeding mechanism needs no gear or the like for moving the optical pickup, it can be constructed with a reduced number of parts and an apparatus having the pickup feeding mechanism adopted therein can be designed to be smaller.

However, since the pickup feeding mechanism is to move the optical pickup by displacing the drive shaft, it is difficult to control the position of the optical pickup with a high accuracy if foreign matter such as dust adheres to the drive shaft.

It is therefore an object of the present invention to provide a novel recording and/or reproducing apparatus that can prevent foreign matter such as dust from adhering to a drive shaft when an electromechanical transducer is used in a pickup feeding mechanism, and that can accurately control the position of a recording and/or reproducing unit to be moved by the drive shaft.

It is another object of the present invention to provide a novel recording and/or reproducing apparatus in which a dustproof cover unit can be simply constructed to prevent foreign matter such as dust from adhering to the drive shaft.

The above object can be attained by providing a novel recording and/or reproducing apparatus including, according to the present invention, a base, a rotation drive unit provided on the base to rotate a disc-shaped recording medium, a recording and/or reproducing unit exposed to the disc-shaped recording medium placed on the rotation drive unit through an opening formed in the base to write an information signal to the disc-shaped recording medium placed on the rotation drive unit and/or read an information signal from the disc-shaped recording medium, a moving unit including a drive shaft to support the recording and/or reproducing unit to be rotatable radially along the disc-shaped recording medium, an electromechanical transducer installed at one end of the drive shaft and that is expanded and contracted axially along the drive shaft to display the drive shaft longitudinally, to move the recording and/or reproducing unit radially along the disc-shaped recording medium by causing the electromechanical transducer to displace the drive shaft, and a dustproof cover unit provided on the base to cover the drive shaft of the moving unit.

DESCRIPTION OF THE PREFERRED EMBODIMENTS

The disc recorder/player according to the present invention is described in detail with reference to the accompanying drawings. The disc recorder/player is portable, for example, and uses a disc cartridge as a recording medium.

Figure 1:
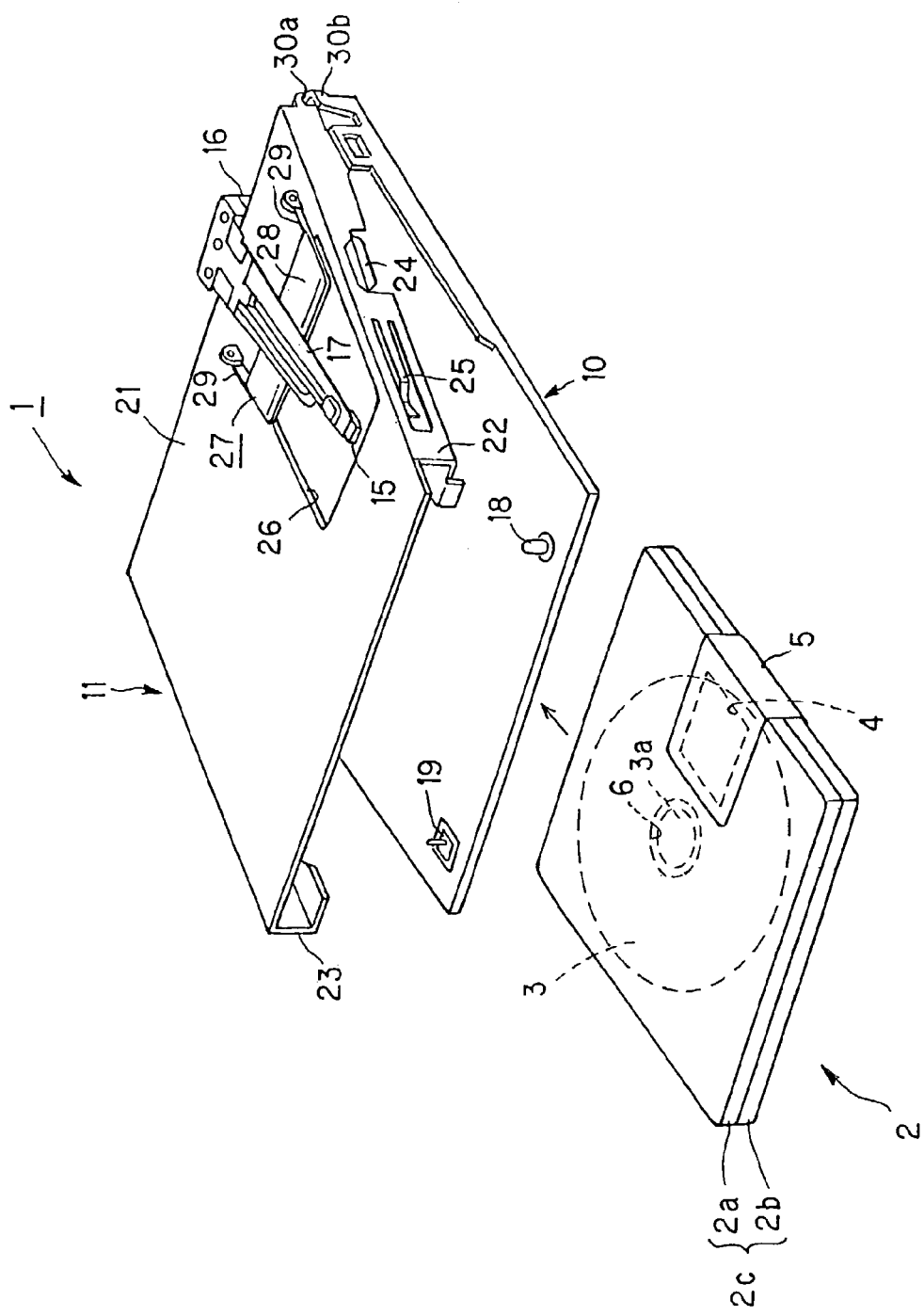
FIG. 1 is a perspective view of the recorder/player according to the present invention.
Figure 2:
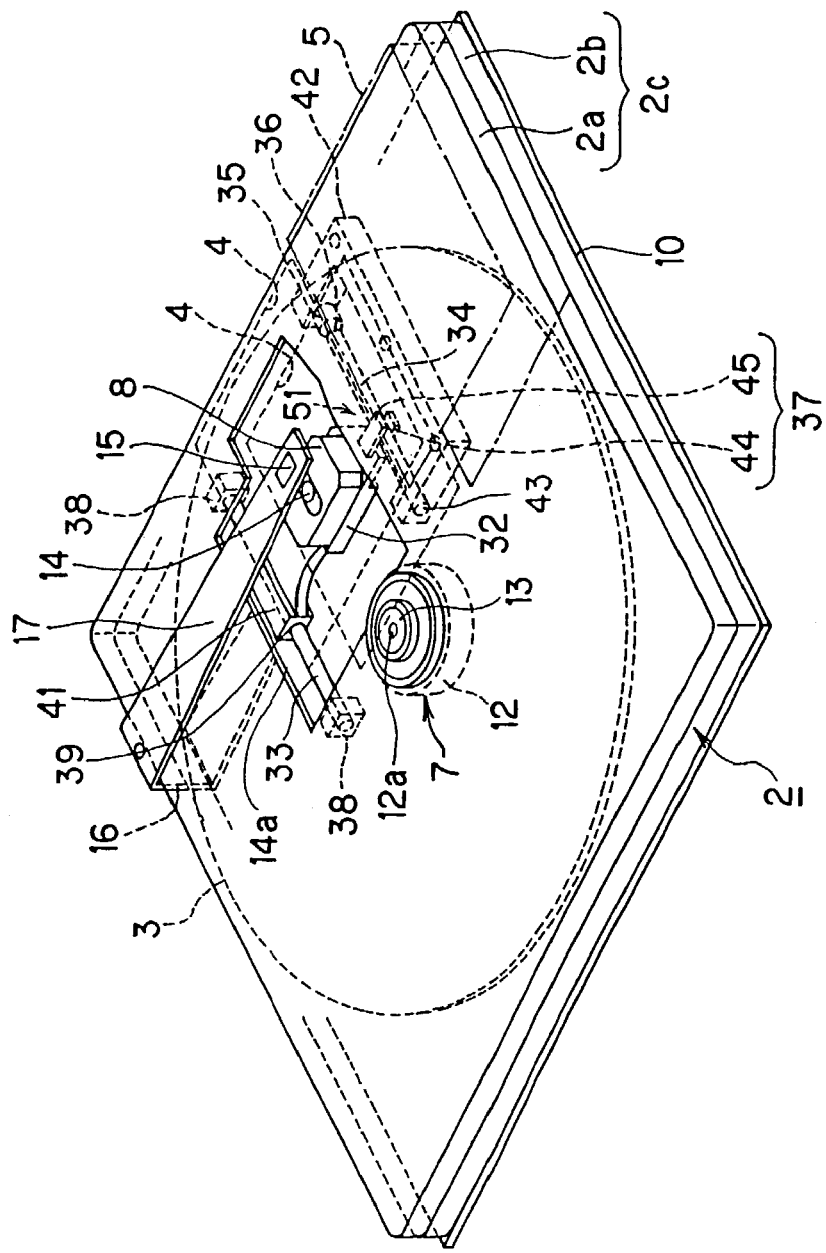
FIG. 2 is also a perspective view of the disc cartridge placed on a base in the recorder/player.

As shown in FIGS. 1 and 2, the disc recorder/player, generally indicated by reference 1, uses a disc cartridge 2. The disc cartridge 2 is formed from a cartridge body 2c including a pair of cartridge halves 2a and 2b butted together and in which, e.g., a magneto-optical disc 3 is rotatably encased.

The magneto-optical disc 3 includes at the center thereof a clamping plate 3a that is to be engaged on a disc table 13 forming a disc rotation drive mechanism in the disc recorder/player 1. The clamping plate 3a is made of a metal or the like and is magnetically attracted by a magnet provided at the disc table 13. That is, the magneto-optical disc 3 magnetically attracted to the disc table 13 will rotate along with the disc table 13.

The cartridge body 2c in which the magneto-optical disc 3 is rotatably encased includes write/read openings 4 formed in the generally central front portions of the upper and lower halves 2a and 2b, respectively, opposite to each other and through which a part of the signal recording layer of the magneto-optical disc 3 is externally exposed. The opening 4 in the upper half 2a is provided for allowing a magnetic head applying a magnetic field to the magneto-optical disc 3 to go into the cartridge body 2c, and the opening 4 formed in the lower half 2b is provided for allowing the optical pickup 8 to face the magneto-optical disc 3.

Also, on the front portion of the cartridge body 2c, a shutter member 5 that covers and uncovers the write/read openings 4 is slidably installed. The shutter member 5 is formed from a flat plate bent in the form of a generally C shape parallel to the surfaces of the cartridge body 2c. Each of the main sides of the shutter member 5 is formed to have sufficient dimensions to cover the write/read openings 4. The shutter member 5 uncovers the openings 4 only when the cartridge disc 2 is loaded in the disc recorder/player 1, and covers the openings 4 when the disc cartridge 2 is not being used.

Also, in the center of the lower half 2b of the cartridge body 2c, a generally circular disc drive opening 6 is formed through which the clamping plate of the magneto-optical disc 3 is externally exposed. When the disc cartridge 2 is loaded in the disc recorder/player 1, the disc table 13 goes into the cartridge body 2c through the opening 6 and the clamping plate 3a and disc table 13 engage with each other.

The disc cartridge 2 is loaded first at the side thereof perpendicular to the front end of the cartridge body 2c into the disc recorder/player 1. Then, the shutter member 5 slides along the front surfaces of the cartridge body 2c in a direction parallel to the disc cartridge inserting direction, and thus uncovers the write/read openings 4 to enable writing to or reading from the magneto-optical disc 3.

It is also noted that in the cartridge body 2c other discs may be encased in place of the magneto-optical disc, such as a read-only optical disc having data pre-recorded therein as bit patterns, a recordable optical disc whose recording layer is formed from an organic dye material and that can record data to the recording layer, a rewritable optical disc whose recording layer is formed from a phase-change material and in which data can be rewritten, a magnetic disc, etc.

Figure 3:
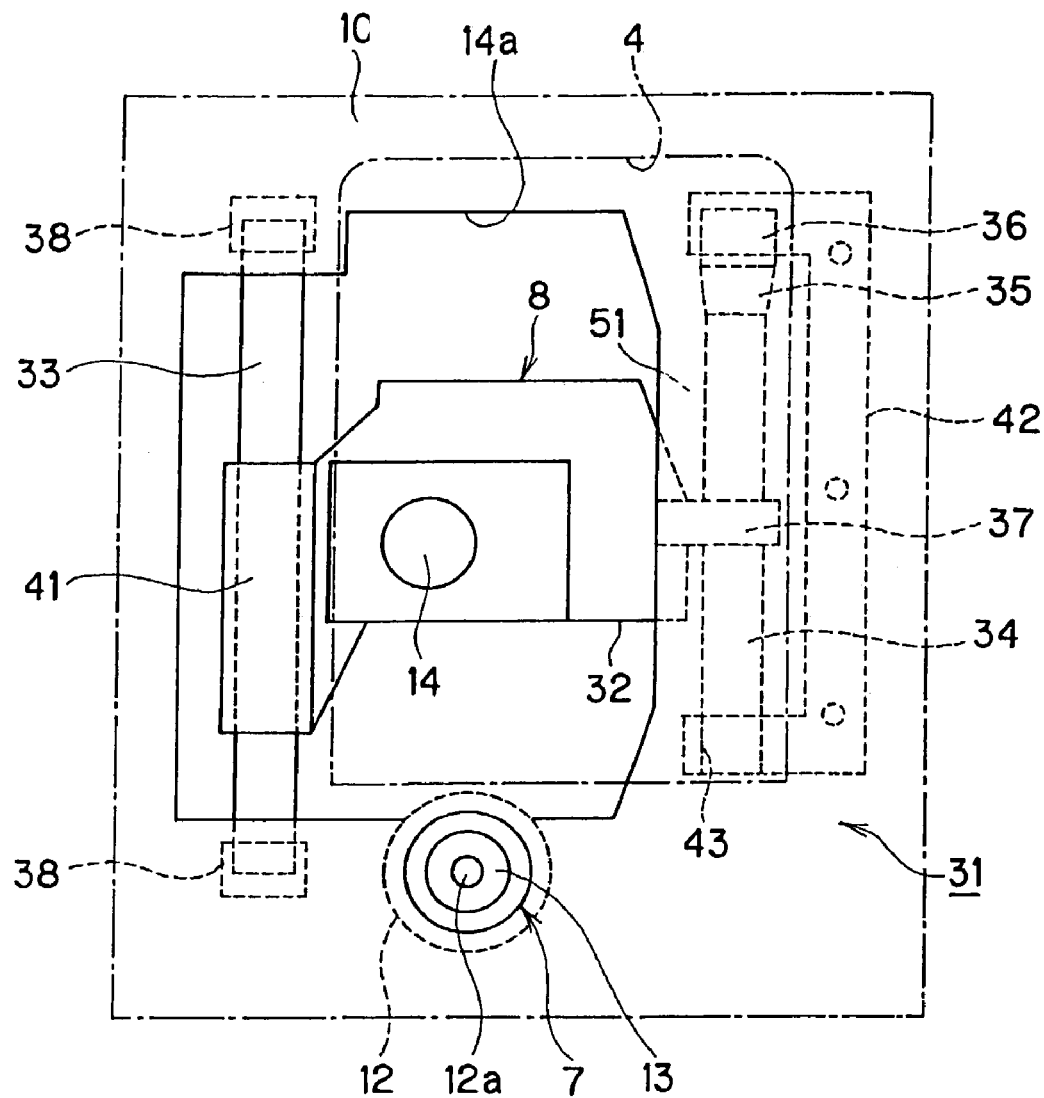
FIG. 3 is a plan view of the recorder/player.

The disc recorder/player 1 using the aforementioned disc cartridge 2 as the recording medium is now described. The disc recorder/player 1 includes an apparatus body having a cartridge receptacle in which the disc cartridge 2 is received, and a lid member (not shown) that covers and uncovers the cartridge receptacle included in the apparatus body. As shown in FIGS. 1 to 3, a housing forming the apparatus body includes a base 10 having formed at one side thereof the cartridge receptacle in which the disc cartridge 2 is placed. The base 10 has installed pivotably thereon a cartridge holder 11 that holds the disc cartridge 2. The cartridge holder 11 is pivotable along with the lid member that forms a part of the housing. For playing the disc cartridge 2 in this disc recorder/player 1, the lid member is moved to uncover the cartridge receptacle, the disc cartridge 2 is introduced into the cartridge holder 11 and held therein, and the lid member is pivoted in a direction of covering the cartridge receptacle in the base 10 to put the disc cartridge 2 thus held in the cartridge holder 11 into the cartridge receptacle formed in the base 10. Thus, the disc recorder/player 1 is enabled to write data to or read data from the magneto-optical disc 3 in the disc cartridge 2. More specifically, with the disc cartridge 2 being received in the cartridge receptacle, the write/read openings 4 are uncovered as the shutter member 5 is slid along the front surfaces of the cartridge body 2c, the disc table 13 goes into the cartridge body through the generally central opening 6 in the lower half 2b of the cartridge body 2c, and the clamping plate 3a is magnetically attracted by the disc table 13 into engagement with each other.

Provided on the base 10 included in the housing of the apparatus body are a disc rotation drive mechanism 7 to rotate the magneto-optical disc 3 encased in the cartridge body 2c and the optical pickup 8 to write or read information signals to or from the magneto-optical disc 3, as shown in FIGS. 1 to 3.

The disc rotation drive mechanism 7 includes a spindle motor 12 to rotate the magneto-optical disc 3. The spindle motor 12 has a drive shaft 12a provided nearly in the bottom center of the base 10 to project to the upper side of the base 10. The drive shaft 12a has fixed thereto the disc table 13 that is to be engaged with the clamping plate 3a of the magneto-optical disc 3. The disc table 13 has built therein a magnet that magnetically attracts the clamping plate 3a, and which can thus rotate the magneto-optical disc 3 magnetically attracted thereon.

The optical pickup 8 provided on the base 10 includes an optical system including a semiconductor laser (not shown) as a source of a light beam, an objective lens 14 to focus a light beam emitted from the semiconductor laser, a photodetector (not shown) to detect a return light from the magneto-optical disc 3, etc. The light beam emitted from the semiconductor laser is focused by the objective lens 14 onto the signal recording layer of the magneto-optical disc 3. A return light reflected at the signal recording layer of the magneto-optical disc 3 is converted by the photodetector into an electrical signal and the electrical signal is supplied to an RF amplifier (not shown).

The optical pickup 8 also includes an objective lens 14 drive mechanism to displace the objective lens 14 in the optical-axial direction. The objective lens drive mechanism is a uniaxial actuator to displace the objective lens 14 in the focusing direction as the direction of the optical axis of the objective lens 14. The objective lens drive mechanism includes a magnet provided on a base of the optical pickup 8, for example, and a coil provided on a holder of the objective lens 14 opposite to the magnet. A current flowing through the coil correspondingly to a focusing servo signal and a magnetic field produced by the magnet yield a driving force that displaces the objective lens 14 in the focusing direction.

That is, by including no tracking control drive unit (in contrast to the background objective lens drive mechanism that includes a biaxial actuator for control of both focusing and tracking), the objective lens drive mechanism according to the present invention is designed to be compact and lightweight. In the disc recorder/player 1 according to the present invention, a feeding mechanism 31 for the optical pickup 8, which will be described in detail below, feeds the optical pickup 8 and a magnetic head 15 radially along the magneto-optical disc 3 and controls the tracking of the objective lens 14. In the optical pickup 8, the objective lens 14 is exposed to the cartridge receptacle, in which the disc cartridge 2 is placed, through an optical pickup opening 14a formed in the base 10 correspondingly to a moving area of the optical pickup 8.

The optical pickup 8 also includes installed thereto the magnetic head 15 positioned opposite to the objective lens 14 with the magneto-optical disc 3 taking a position between them. The magnetic head 15 is installed at the free end of a head support arm 17 fixed to a coupling 16 that couples the optical pickup 8 and magnetic head 15 with each other. The head support arm 17 is made of an elastically flexible member such as a gimbal spring. Head support arm 17 forces the magnetic head 15 toward the magneto-optical disc 3 for sliding on the magneto-optical disc 3 to apply a magnetic field to the magneto-optical disc 3 only at the time of recording.

The cartridge receptacle formed at one of the main sides of the base 10 is provided with a positioning projection 18 to appropriately position the disc cartridge 2 to be placed into the base 10, a sensor 19 such as a pressure-sensitive switch that detects the disc cartridge placed on the base 10, etc.

As shown in FIG. 1, the cartridge holder 11 installed pivotably to the base 10 is formed, by bending, a thin resilient metal plate such as a stainless steel sheet to have sufficient dimensions to hold the disc cartridge 2. The cartridge holder 11 includes a top plate portion 21 formed generally rectangular to have sufficient dimensions to cover the upper side of the disc cartridge 2, and first and second cartridge holding portions 22 and 23 to hold the opposite sides of the disc cartridge 2 inserted in the cartridge holder 11. Each of the first and second cartridge holding portions 22 and 23 includes a lateral side wall formed by bending each lateral side portion of the top plate portion 21 orthogonally and a cartridge holding lug formed by bending the end portion of the lateral side wall in parallel to the top plate portion 21. Namely, each of the cartridge holding portions 22 and 23 is formed to have a generally C-shaped section for holding the lateral sides of the disc cartridge 2.

The cartridge holder 11 is open at the front thereof perpendicular to the first and second cartridge holding portions 22 and 23. The disc cartridge 2 is inserted into or ejected from the cartridge holder 11 though the opening. The disc cartridge 2 introduced into the cartridge holder 11 is held at the front portion thereof where the shutter member 5 is provided and at the rear portion thereof in the first and second cartridge holding portions 22 and 23.

The lateral side wall included in the first cartridge holding portion 22 of the cartridge holder 11 has a shutter release piece 24 formed nearly at the longitudinal center thereof. The shutter release piece 24 is turned inwardly of the cartridge holder 11. As the disc cartridge 2 is introduced into the cartridge holder 11, the shutter release piece 24 enters a recess formed in one lateral side of the disc cartridge 2 and elastically deforms a shutter locking member to unlock the shutter member 5. The shutter release piece 24 moves the shutter member 5 in a direction opposite to the direction in which the cartridge body 2c is inserted into the cartridge holder 11, to thereby uncover the write/read openings 4.

A shutter member retaining piece 25 is formed in a portion of the lateral side wall included in the first cartridge holding portion 22, rather nearer to the cartridge insert/eject opening than the shutter release piece 24. The shutter member retaining piece 25 retains the shutter member 5 on the disc cartridge 2 inserted in the cartridge holder 11 in a position where it uncovers the write/read openings 4. When ejecting the disc cartridge 2 out of the cartridge holder 11, the shutter member retaining piece 25 holds the shutter member 5 on the cartridge body 2c being moved in the direction in which the cartridge body 2c is ejected out from the cartridge holder 11 and moves the shutter member 5 in the direction of covering the write/read openings 4. The shutter member retaining piece 25 is formed by making a U-shaped cut in the lateral wall included in the first cartridge holding portion 22 to be elastically displaceable along with the lateral side wall. The shutter member retaining piece 25 is formed to extend from the base toward the free end of the lateral side wall and has formed at the free end thereof an engagement projection that is to be engaged in an engagement hole in the shutter member 5. With the engagement projection being engaged in the engagement hole in the shutter member 5, the shutter member retaining piece 25 holds the shutter member 5 in a position where the shutter member 5 uncovers the write/read openings 4.

The top plate portion 21 of the cartridge holder 11 has a magnetic head opening 26 formed therein. The magnetic head 15 coupled to the optical pickup 8 extends to the top plate portion 21 of the cartridge holder 11 and is exposed to the inside of the cartridge holder 11 through the magnetic head opening 26. The magnetic head opening 26 is provided in a position to be aligned with the write/read openings 4 uncovered by the shutter member 5 moved in one direction when the disc cartridge 2 is received in the cartridge receptacle formed on the base 10.

The top plate portion 21 of the cartridge holder 11 has provided thereon a lifting member 27 that moves the head support arm 17 having the magnetic head 15 installed at the free end thereof up or down for moving the magnetic head 15 toward or away from the magneto-optical disc 3 depending upon a selected mode of operation. The lifting member 27 includes a pivoting plate 28 located under the head support arm 17 to pivot the head support arm 17. The pivoting plate 28 includes a pair of support arms 29 provided at either side of the base end thereof. Each support arm 29 has a spindle formed at the base end thereof. The lifting member 27 extends across the magnetic head opening 26 formed in the top plate portion 21 of the cartridge holder 11, and is installed to the top plate portion 21 with the spindle of each support arm 29 being pivoted to a pivot support piece formed by cutting and raising a part of the top plate portion 21. The lifting member 27 is pivoted by a drive mechanism (not shown) to move the magnetic head 15 toward or away from the magneto-optical disc 3 in the disc cartridge 2 received in the cartridge receptacle on the base 10. When recording data to the magneto-optical disc 3, the lifting member 27 lowers the magnetic head 15 until the magnetic head 15 slides on the magneto-optical disc 3. When reading data from the magneto-optical disc 3, stopping a recording, finishing playback, or ejecting the disc cartridge 2, the lifting member 27 will move the magnetic head 15 to lift up the magnetic head 15 away from the magneto-optical disc 3.

The cartridge holder 11 also includes bearing holes 30a formed at the base ends of the first and second cartridge holding portions 22 and 23 and the base 10 has spindles 30b formed thereon. The cartridge holder 11 is pivotably supported on the base 10 with the spindles 30b of the base 10 being borne in the respective bearing holes 30a of the cartridge holder 11.

Figure 4:
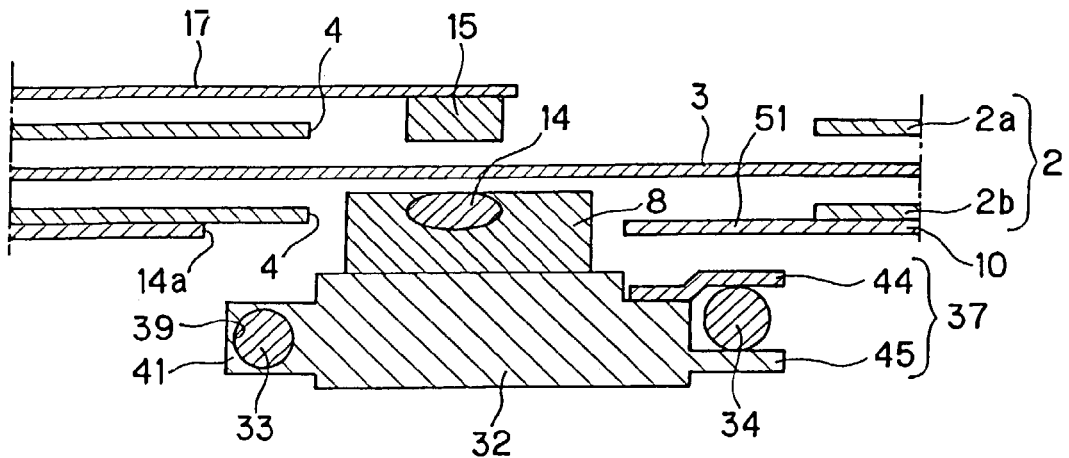
FIG. 4 is a sectional view of the recorder/player.

As shown in FIGS. 1, 3, and 4, the head support arm 17 having the magnetic head 15 fixed to the free end thereof is coupled to the optical disc 8 by the coupling 16. The optical pickup 8 is supported by the optical pickup feeding mechanism 31 to be movable radially along the magneto-optical disc 3 in the disc cartridge 2 received in the cartridge receptacle on the base 10. The optical pickup feeding mechanism 31 includes a guide shaft 33 supporting a fixing block 32 to which the optical pickup 8 is installed to be movable radially along the magneto-optical disc 3, a drive shaft 34 disposed parallel to the guide shaft 33, an electromechanical transducer 35 installed at one end of the drive shaft 34, a fixture 36 to fix the electromechanical transducer 35, and a coupling 37 supported on the drive shaft 34 to be axially slidable and that couples the fixing block 32 and drive shaft 34 with each other.

The guide shaft 33 is disposed radially along the magneto-optical disc 3 and has opposite ends thereof fixed with a pair of support members 38 provided around the optical pickup opening 14a formed in the base 10. The fixing block 32 includes integrally formed therewith a support block 41 having formed therein a guide hole 39 in which the guide shaft 33 is inserted. Therefore, with the fixing block 41 being introduced into the guide hole 39 in the support block 41, the objective lens 14 is exposed through the optical pickup opening 14a to the cartridge receptacle in which the disc cartridge 2 is received and the optical pickup 8 is movable radially along the magneto-optical disc 3.

The drive shaft 34 is long enough to move the fixing block 32 across the magneto-optical disc 3 from the inner circumference to outer circumference or vice versa. The drive shaft 34 is a frictional member and has the electromechanical transducer 35 installed at one end thereof. The electromechanical transducer 35 is formed from a piezoelectric material or the like. Applied with an excitation voltage from a drive circuit (not shown), the electromechanical transducer 35 expands and contracts axially of the drive shaft 34. The expansion rate is different from the contraction rate, and thus the electromechanical transducer 35 will oscillate the drive shaft 34 axially. The electromechanical transducer 35 is fixed at one end thereof to the fixture 36, and thus the fixture 36 works as a balancer when the electromechanical transducer 35 is oscillating. The fixture 36 is supported on a fixing member 42 fixed to the rear side of the base 10. More specifically, the fixture 36 is installed at one end of the fixing member 42 having formed in the other end thereof a support hole 43 in which the other end of the drive shaft 34 is supported. The other end of the drive shaft 34 is engaged in the support hole 43 to be oscillatable axially thereof. That is, the drive shaft 34 is supported on the fixing member 42 to be movable axially thereof under the effect of the displacement of the electromechanical transducer 35.

The coupling 37 includes a first coupling piece 45 and a second coupling piece 44 formed integrally with the fixing block 32. The first coupling piece 45 is formed to project from an end of the fixing block 32 opposite to the support block 41 toward the drive shaft 34. The second coupling piece 44 is formed from an elastically displaceable material such as a leaf spring or the like and is fixed, by screwing or otherwise, to the fixing block 32 in a cantilevered state. These coupling pieces 44 and 45 are disposed opposite to each other and the drive shaft 34 is provided between them so that the fixing block 32 is supported to be slidable axially along the drive shaft 34. Therefore, the fixing block 32 has the guide shaft 33 inserted in the guide hole 39 in the support block 41 thereof and supports the coupling 37 to be slidable axially along the drive shaft 34, so that the fixing block 32 is supported to be movable axially along the guide shaft 33 and drive shaft 34, and radially along the magneto-optical disc 3.

The optical pickup feeding mechanism 31 constructed as above slides the coupling 37 axially along the drive shaft 34 by applying an excitation voltage as a drive signal to the electromechanical transducer 35, which will thus expand and contract to displace the drive shaft 34 axially. Thus, the fixing block 32 supporting the optical pickup 8 and magnetic head 15 can be moved radially along the magneto-optical disc 3.

Figure 5:
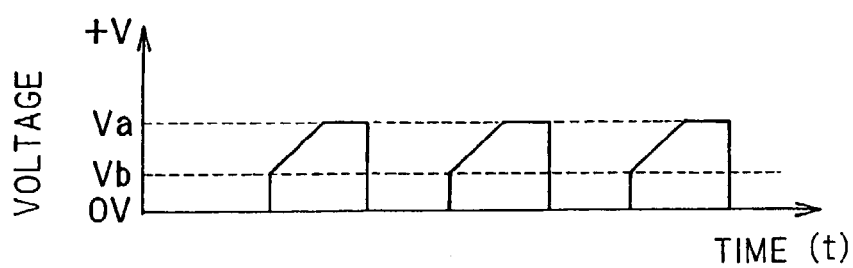
FIG. 5 shows the waveform of an excitation voltage applied to the electromechanical transducer.

More particularly, the electromechanical transducer 35 is applied with an excitation voltage, as a drive signal shown in FIG. 5, in which each pulse first rises steeply up to a first predetermined voltage Vb at the leading edge thereof, gradually rises linearly to a second predetermined voltage Va, then holds the second predetermined voltage Va for a predetermined period of time, and falls steeply down to 0 V at the trailing edge thereof. It should be noted that the electromechanical transducer 35 will not activate until a voltage reaches the first predetermined voltage Vb, and will start acting at the first predetermined voltage Vb.

More particularly, when moving the fixing block 32 linearly in one direction, the electromechanical transducer 35 is applied with an excitation voltage as shown in FIG. 5. That is, at the leading edge of the excitation voltage, the electromechanical transducer 35 will not activate until the applied excitation voltage rises steeply or vertically up to the first predetermined voltage Vb at which time the electromechanical transducer 35 will start acting. Namely, the electromechanical transducer 35 will not start acting at the leading edge of the excitation voltage. Next, after the excitation voltage rises up to the first predetermined voltage Vb and then gradually rises linearly up to the second predetermined voltage Va, the electromechanical transducer 35 will gradually expand while the drive shaft 34 will correspondingly move gradually in one direction. At this time, the fixing block 32 is retained on the drive shaft 34 under the action of friction between the coupling 37 and drive shaft 34 and moves along with the drive shaft 34 in one direction. On the other hand, when the excitation voltage falls steeply or vertically down to 0 V at the trailing edge of the excitation voltage, the electromechanical transducer 35 will quickly contract and the drive shaft 34 will correspondingly move quickly in the other direction. At this time, the coupling 37 slips due to an inertia and against the friction on the drive shaft 34, and thus only the drive shaft 34 moves in the other direction. As a result, the fixing block 32 will slide in one direction in relation to the drive shaft 34.

With the excitation voltage shown in FIG. 5 being applied repeatedly to the electromechanical transducer 35, the optical pickup feeding mechanism 31 can slide the fixing block 32 coupled with the drive shaft 34 by the coupling 37 continuously in one direction in relation to the drive shaft 34. It should be noted that for linear movement of the fixing block 32 in the other direction, it suffices to apply a reverse excitation voltage to the electromechanical transducer 35.

As mentioned above, the optical pickup feeding mechanism 31 applies to the electromechanical transducer 35 an excitation voltage as an operation start voltage for the electromechanical transducer 35 that rises vertically up to the first predetermined voltage Vb. Therefore, it is possible to save power as compared with the application of an excitation voltage that rises linearly from 0 V to the second predetermined voltage Va. Also, it is possible to eliminate the time for which the electromechanical transducer 35 does not operate, and thus smoothen the operation of the optical pickup 8.

In the aforementioned optical pickup feeding mechanism 31, the fixing block 32 can be held stably in an arbitrary position in the moving direction under the effect of friction between the drive shaft 34 and coupling 37 even while the fixing block 32 is not in any driven state, by adjusting the friction between the drive shaft 34 and coupling 37 and adjusting elasticity of the second coupling piece 44 applied to the drive shaft 34. Also, this optical pickup feeding mechanism 31 does not incur any backlash experienced when a gear train is used as in a background optical pickup feeding mechanism, and the driving of the optical pickup feeding mechanism 31 can be controlled with a tracking resolution on the order of nano-millimeters. Therefore, the tracking of the objective lens 14 can also be controlled. Further, the optical pickup feeding mechanism 31 can be driven with no noise in an ultrasound domain of more than 20 kHz, and thus can operate with a reduced operating sound. Moreover, the optical pickup feeding mechanism 31 can be designed to be considerably compact as compared with a background one in which a rotation of a drive motor is converted to a linear motion via a gear train and rack member.

As shown in FIG. 3, the optical pickup opening 14$a$ formed in the base 10 and through which the objective lens 14 is exposed to the cartridge receptacle is formed to have sufficient dimensions to cover the drive shaft 34 included in the optical pickup feeding mechanism 31 and a part of the base 10 covering the drive shaft 34 is formed as a dustproof cover unit 51 that prevents foreign matter such as dust or the like from adhering to the drive shaft 34. When the disc cartridge 2 is loaded into or removed from the disc recorder/player 1, a lid (not shown) connected with the cartridge holder 11 uncovers the cartridge receptacle formed on the base 10 where the disc cartridge 2 is received, and thus foreign matter such as dust or the like will come into the cartridge receptacle from the cartridge insert/eject opening for the disc cartridge 2 thus uncovered. The dustproof cover unit 51 is provided to prevent the foreign matter having entered into the cartridge insert/eject opening from adhering to the drive shaft 34. It should be noted that the drive shaft 34 is covered only at the receptacle side thereof by the dustproof cover unit 51 but not at other directional portions thereof because the base 10 is disposed outside the outer casing and no foreign matter such as dust will enter from other directions than the cartridge receptacle.

Note that the dustproof cover unit 51 is provided integrally with the base 10 but otherwise a cover unit formed, as the dustproof cover unit 51, from a sheet or the like separately from the base 10 may be attached near the optical pickup opening 14$a$ in the base 10 to cover the top of the drive shaft 34. In this case, the dustproof cover unit 51 can easily be attached near the optical pickup opening 14$a$ in the base 10 without any change applied to the design of the base 10.

The disc recorder/player 1 constructed as above functions as described herebelow. First, a lid (not shown) is pivoted in a direction of uncovering the inside of the apparatus body forming, along with the lid, the disc recorder/player 1 to open the cartridge receptacle formed inside the apparatus body. In this condition, the disc cartridge 2 is introduced first with the one lateral side perpendicular to the front side where the shutter member 5 is provided into the apparatus body through the disc insert/eject opening defined for the disc cartridge 2 when the lid uncovers the cartridge receptacle, as shown in FIG. 1. Then, the disc cartridge 2 is held in the cartridge holder 11 cooperating with the lid. At this time, the shutter member 5 is unlocked by the shutter release piece 24 provided on the cartridge holder 11, to slide along the front end face of the cartridge body 2$c$ to uncover the write/read openings 4 in the cartridge body 2$c$. The shutter member 5 is retained by the shutter member retaining piece 25 at the uncovered openings 4, and thus the signal recording layer of the magneto-optical disc 3 is exposed at its area from the inner to outer circumference thereof to outside the cartridge body 2$c$.

When the lid uncovering the inside of the apparatus body is pivoted in a direction of covering the inside of the apparatus body, the disc cartridge 2 held in the cartridge holder 11 is placed in the cartridge receptacle formed on the base 10. Then, the disc table 13 included in the disc rotation drive mechanism 7 enters the disc cartridge 2 through the opening 6 formed nearly in the center of the lower half 2$b$ of the cartridge body 2$c$. The disc table 13 is engaged with the clamping plate 3$a$ provided on the magneto-optical disc 3, and is magnetically attached by the clamping plate 3$a$, so that the magneto-optical disc 3 can be rotated along with the disc table 13.

Next, data writing to the magneto-optical data 3 in the disc cartridge 2 set in the cartridge receptacle will be described. First, when the user presses a record start button on a control panel of the disc recorder/player 1, the spindle motor 12 is activated and the magneto-optical disc 3 is thus rotated. The semiconductor laser included in the optical pickup 8 is excited to emit a light beam at an output level for data recording.

Also, the electromechanical transducer 35 of the optical pickup feeding mechanism 31 is excited by the drive circuit. More particularly, an excitation signal as shown in FIG. 5 is applied to the electromechanical transducer 35. Namely, the drive circuit applies the electromechanical transducer 35 with an excitation voltage in which each pulse first rises steeply up to the first predetermined voltage Vb at the leading edge thereof, then gradually rises linearly up to the second predetermined voltage Va, then maintains the second predetermined voltage Va for a predetermined period of time, and then falls steeply down to 0 V at the trailing edge thereof. The electromechanical transducer 35 is not sensitive to the voltage up to the first predetermined voltage Vb and the fixing block 32 will not start moving. Then, when the excitation voltage rises up to the first predetermined voltage Vb and then gradually rises linearly up to the second predetermined voltage Va, the electromechanical transducer 35 will gradually expand while the drive shaft 34 will correspondingly move gradually in one direction. At this time, the fixing block 32 is retained on the drive shaft 34 under the action of friction between the coupling 37 and drive shaft 34 and moves along with the drive shaft 34 in one direction. When the excitation voltage falls steeply or vertically down to 0 V, the electromechanical transducer 35 will quickly contract and the drive shaft 34 correspondingly moves quickly in the other direction. At this time, the coupling 37 slips due to an inertia and against the friction on the drive shaft 34, and thus only the drive shaft 34 moves in the other direction. As a result, the fixing block 32 will slide in one direction in relation to the drive shaft 34.

With the excitation voltage shown in FIG. 5 being applied repeatedly to the electromechanical transducer 35, the optical pickup feeding mechanism 31 can slide the fixing block 32 coupled with the drive shaft 34 by the coupling 37 continuously in one direction in relation to the drive shaft 34. Thus, the optical pickup 8 is moved to the inner circumference of the magneto-optical disc 3, and the objective lens drive mechanism executes focus servo control based on a focus servo signal. The optical pickup 8 will thus start reading data for a location of a recorded address of the data.

When an address of recorded data is thus located, the magnetic head 15 is moved to near the magneto-optical disc 3 as the lifting member 27 is pivoted. The magneto-optical disc 3 is illuminated with a light beam emitted from the optical pickup 8, heated to a higher temperature than the Curie temperature, and applied with a magnetic field from the magnetic head 15. Thus, data recording is started.

At this time, the drive circuit of the electromechanical transducer 35 included in the optical pickup feeding mechanism 31 is supplied with a tracking servo signal. Then, the drive circuit applies the electromechanical transducer 35 with an excitation voltage as shown in FIG. 5 on the basis of the tracking signal to move the optical pickup 8 radially along the magneto-optical disc 3 for tracking control of the objective lens 14. That is, the optical pickup feeding mechanism 31 makes fine tracking control of the objective lens 14 and coarsely feeds the optical pickup 8 radially along the magneto-optical disc 3.

For reading data from the magneto-optical disc 3 in the disc cartridge 2, the magnetic head 15 is spaced by the lifting member 27 away from the magneto-optical disc 3 since the magneto-optical disc 3 does not need to have any magnetic field applied thereto. A light beam is projected from the optical pickup 8 onto the magneto-optical disc 3, and a return light from the magneto-optical disc 3 is detected to read data. Also for this data reading, the optical pickup feeding mechanism 31 feeds the optical pickup 8 radially along the magneto-optical disc 3 while executing tracking control of the objective lens 14 based on a tracking servo signal. Also, focus control of the objective lens 14 is made by the objective lens drive mechanism.

Using the optical pickup feeding mechanism 31, the disc recorder/player 1 can be constructed of a considerably reduced number of parts and can be more compact and lightweight as compared with a background one in which a rotation of a drive motor is converted to a linear motion via a gear train and rack member. Also, in the disc recorder/player 1 according to the present invention, the fixing block 32 can be moved by the optical pickup feeding mechanism 31 using the electromechanical transducer 35 to execute tracking control and feeding of the optical pickup 8, so that the objective lens drive mechanism for the optical pickup 8 does not have to use any tracking control coil and magnet. Thus, the disc recorder/player 1 can be designed to be more simple and compact. Further in the disc recorder/player 1, the drive shaft 34 included in the optical pickup feeding mechanism 31 is covered with the dustproof cover unit 51 provided integrally with the base 10. Therefore, when inserting or removing the disc cartridge 2, foreign matter such as dust can be prevented from entering through the cartridge insert/eject opening and adhering to the drive shaft 34. Thus, the optical pickup feeding mechanism 31 can execute tracking control of the objective lens 14 with a high accuracy in addition to accurately moving the optical pickup 8 radially along the magneto-optical disc 3.

Figure 6:
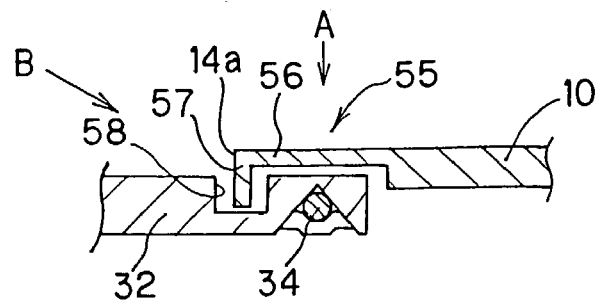
FIG. 6 is a sectional view of the dustproof cover unit to prevent dust or the like from adhering to the drive shaft.

In the above explanation, the dustproof cover unit 51 provided integrally with the base 10 has been described as a unit covering the top of the drive shaft 34 included in the optical pickup feeding mechanism 31. Alternatively, the dustproof cover unit 51 may be constructed as shown in FIG. 6. As shown, the dustproof cover unit indicated by reference 55 includes a first covering portion 56 to cover the top of the drive shaft 34 and a second covering portion 57 formed by bending down the free end of the first covering portion 56, both being provided on the base 10. The second covering portion 57 is engaged in a guide recess 58 formed in the fixing block 32 along the moving direction of the optical pickup 8. Of this dustproof cover unit 55, the first covering portion 56 can prevent foreign matter (indicated with arrow A) from adhering to the drive shaft 34 from above, while the second covering portion 57 can prevent foreign matter (indicated with arrow B) from adhering to the drive shaft 34 from a lateral side. Therefore, the dustproof cover unit 55 can prevent foreign matter from adhering to the drive shaft 34 more effectively than the dustproof cover unit 51. Further, since the dustproof cover unit 55 is formed integrally with the base 10, it can be constructed of a number of parts not larger than in the dustproof cover unit 51 and more simply to prevent foreign matter from adhering to the drive shaft 34.

Figure 7:
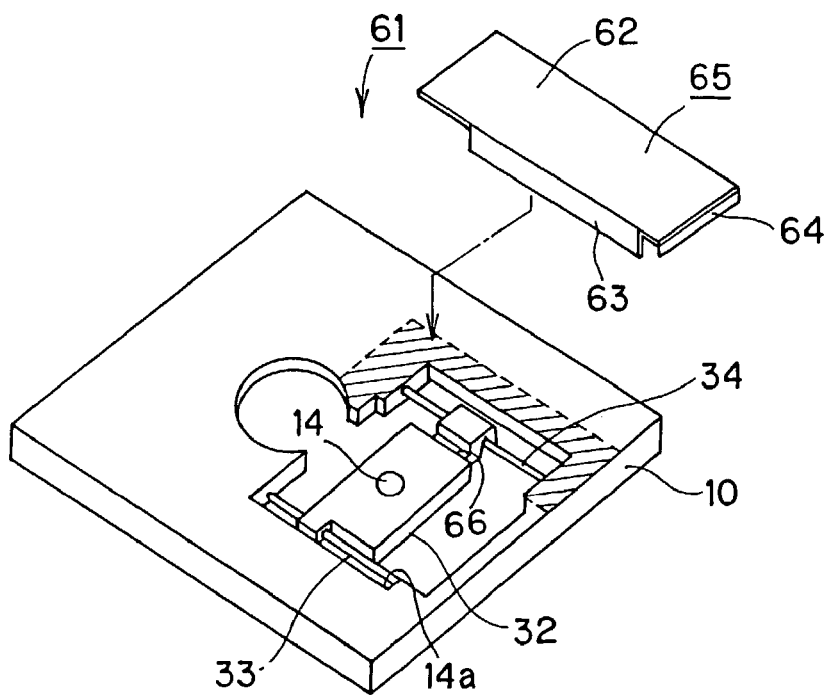
FIG. 7 is a perspective view of a variant of the dustproof cover unit.
Figure 8:
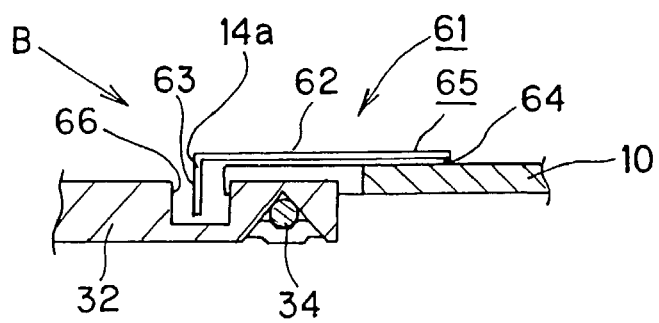
FIG. 8 is a sectional view of the dustproof cover unit in FIG. 7.

The dustproof cover unit 55 is formed integrally with the base 10. However, the dustproof member may be provided separately from the base 10 as shown in FIGS. 7 and 8. As shown, the dustproof member indicated by reference 61 is formed from a cover unit 65 such as a sheet or the like. The cover unit 65 includes a first covering portion 62 to cover the top of the drive shaft 34, and a second covering portion 63 formed by bending down the free end of the first covering portion 62. Of this cover unit 65, the first covering portion 62 has an adhesive layer 64 provided on a part of the rear side thereof. The cover unit 65 is attached with the adhesive layer 64 thereof to near the optical pickup opening 14a in the base 10. The second covering portion 63 is engaged in a guide recess 66 formed in the fixing block 32 along the moving direction of the optical pickup 8 when the cover unit 65 is attached as above. Of the dustproof member 61, the first covering portion 62 can prevent foreign matter (indicated with arrow A) from adhering to the drive shaft 34 from above, while the second covering portion 63 can prevent foreign matter (indicated with arrow B) from adhering to the drive shaft 34 from a lateral side. Therefore, the dustproof member 61 can prevent foreign matter from adhering to the drive shaft 34 more effectively than the dustproof cover unit 51. Also, with only the guide recess 66 formed in the fixing block 32, the cover unit 65 including the first and second covering portions 62 and 63 can easily be attached near the optical pickup opening 14a in the base 10 without having to change the design of the base 10.

Figure 9:
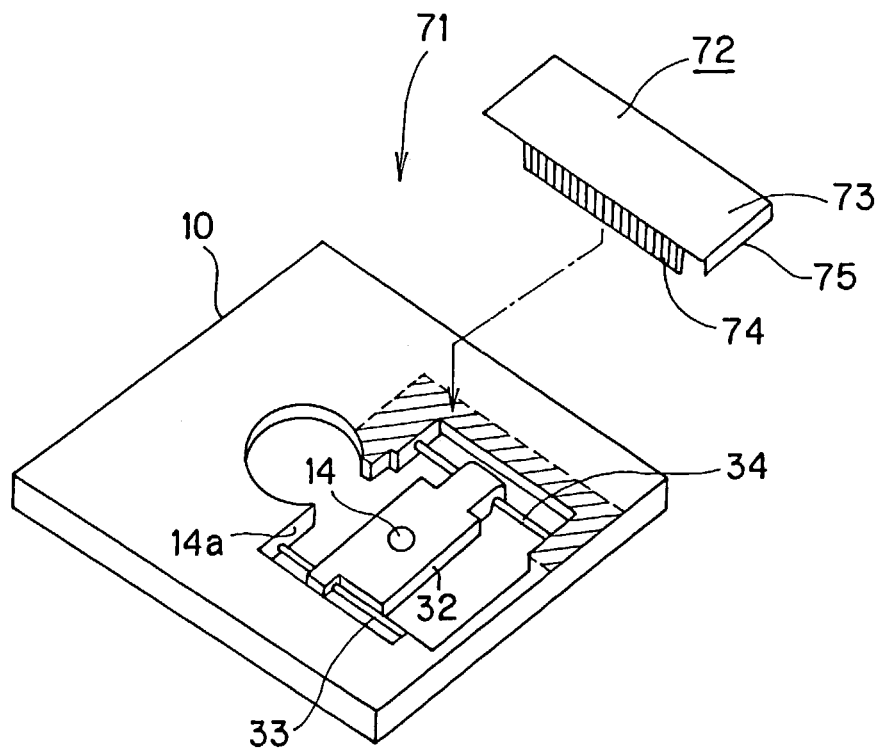
FIG. 9 is a perspective view of another variant of the dustproof cover unit.
Figure 10:
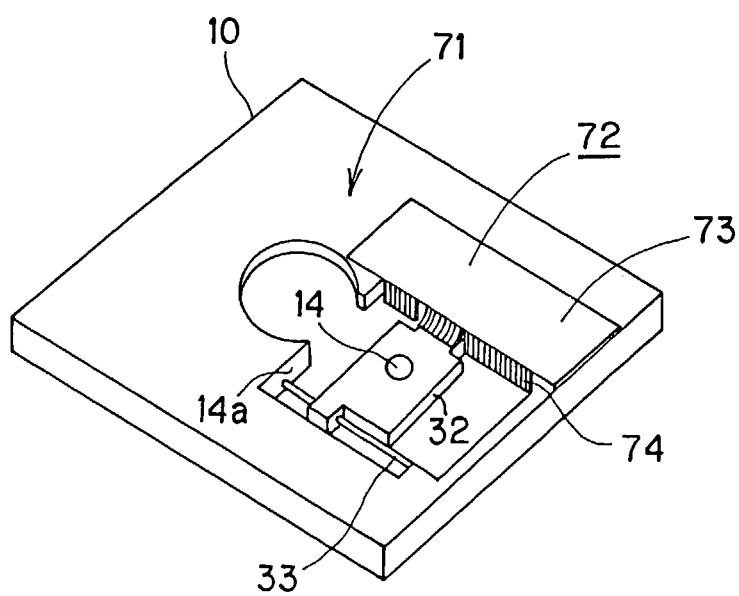
FIG. 10 is a perspective view of the dustproof cover unit shown in FIG. 9.
Figure 11:
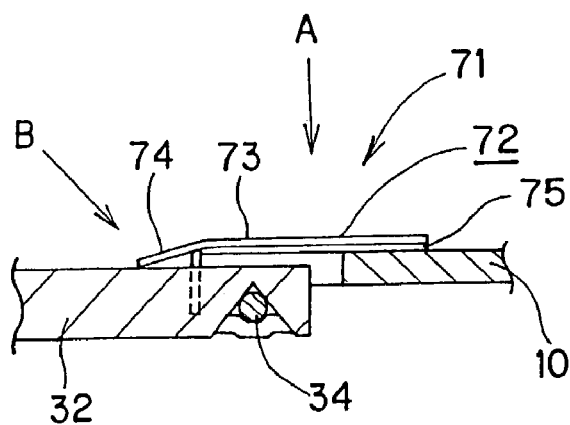
FIG. 11 is a sectional view of the dustproof cover unit in FIG. 10.
Figure 12:
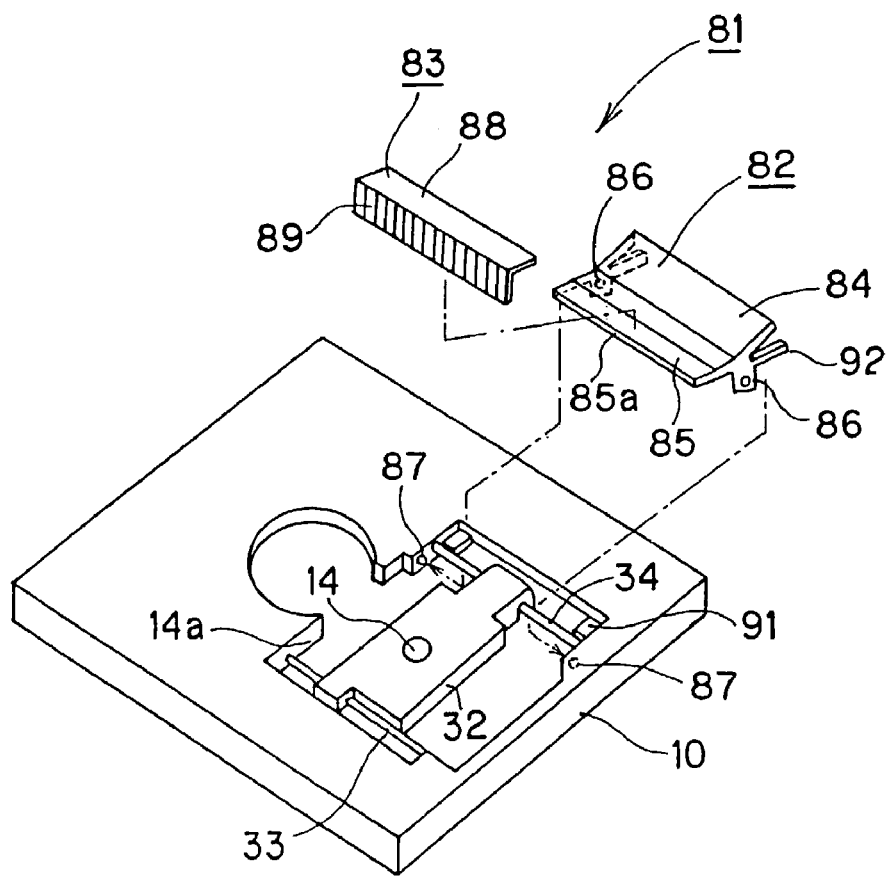
FIG. 12 is an exploded perspective view of a still another variant of the dustproof cover unit.
Figure 13:
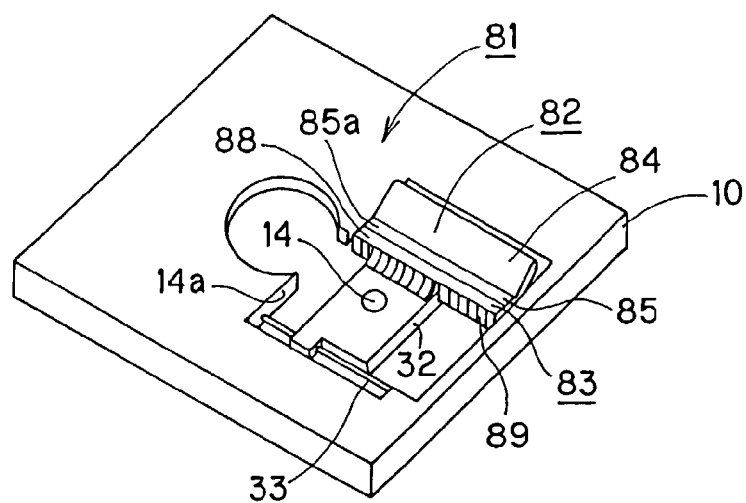
FIG. 13 is also an exploded perspective view of the dustproof cover unit in FIG. 12.

Further, the dustproof member 61 formed separately from the base 10 may be constructed as shown in FIGS. 9 to 11. As shown, the dustproof member indicated by reference 71 is a flexible cover unit 72 that includes a first covering portion 73 to cover the top of the drive shaft 34, and a second covering portion 74 formed by bending down the free end of the first covering portion 73. The second covering portion 74 is formed generally like a comb having parallel cuts formed therein. The second covering portion 74 is raised at a portion thereof lying above the fixing block 32 by the fixing block 32 and at portions other than above the fixing block 32 are generally perpendicular to the first covering portion 73.

Therefore, for the dustproof member 71, no guide recesses 58 and 66 need be provided as in the second covering portions 57 and 63 of the aforementioned dustproof members 55 and 61, respectively. Since the second covering portion 74 is easily flexibly deformed, it will not block the fixing block 32 from moving. Such a cover unit 72 has an adhesive layer 75 provided on one side thereof, and can be attached near the optical pickup opening 14a in the base 10.

Of the cover unit 72, the first covering portion 73 can prevent foreign matter (indicated with arrow A) from adhering to the drive shaft 34 from above, while the second covering portion 74 can prevent foreign matter (indicated with arrow B) from adhering to the drive shaft 34 from a lateral side. Therefore, the cover unit 72 can prevent foreign matter from adhering to the drive shaft 34 more effectively than the dustproof cover unit 51. Also, the cover unit 72 of the dustproof member 71, including the first and second covering portions 73 and 74, can easily be attached near the optical pickup opening 14a in the base 10 without having to form the guide recess 66 in the fixing block 32 and without having to change the design of the base 10.

Further, the dustproof member may be constructed as shown in FIGS. 12 to 15. This dustproof member indicated by reference 81 is installed near the optical pickup opening 14a in the base 10, and includes a pivoting member 82 that is pivoted by the disc cartridge 2 being inserted into the cartridge receptacle, and a cover unit 83 installed to the pivoting member 82.

The pivoting member 82 includes a first portion 84 that will be pressed by the disc cartridge 2 being inserted into the cartridge receptacle formed on the base 10 and a second portion 85 to which the cover unit 83 is fixed, the first and second portions 84 and 85 being disposed with a predetermined angle between them. The second portion 85 becomes a first covering portion 85a that covers the top of the drive shaft 34. The pivoting member 82 has formed in longitudinal opposite end portions thereof shaft holes 86 in which spindles 87 provided near the optical pickup 14a in the base 10 and also near the drive shaft 34 are borne to install the second portion 85 vis-à-vis the optical pickup opening 14a. Also, the pivoting member 82 has an elastic piece 92 that is pressed to a pivot limiter 91 provided on the base 10.

The cover unit 83 is flexible, and secured to the second portion 85 with an adhesive or the like. The cover unit 83 includes a fixture 88 working also as a first covering portion and that is fixed to the second portion 85 covering the top of the drive shaft 34, and a second covering portion 89 formed by bending down the free end of the fixture 88. The second covering portion 89 is formed generally like a comb having parallel cuts formed therein. The second covering portion 89 is raised at a portion thereof lying on the fixing block 32 by the fixing block 32 and its portions other than above the fixing block 32 are generally perpendicular to the fixture 88. Therefore, for the dustproof member 81, no guide recesses 58 and 66 need be provided as in the second covering units 57 and 63 of the aforementioned dustproof members 55 and 61, respectively. Such a cover unit 83 is fixed to the second portion 85 of the pivoting member 82 with an adhesive or the like.

Figure 14:
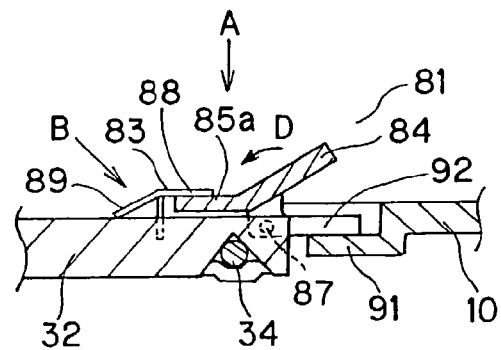
FIG. 14 is a sectional view of the dustproof cover unit shown in FIGS. 12 and 13 when the disc cartridge is not placed in the cartridge receptacle.
Figure 15:
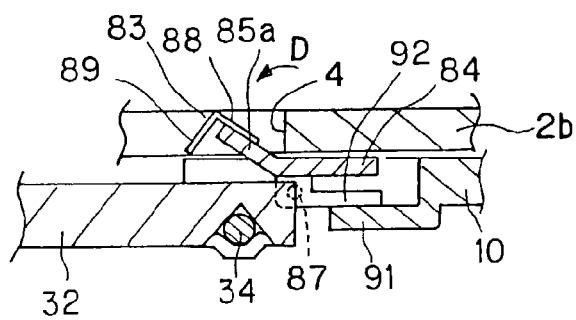
FIG. 15 is a sectional view of the dustproof cover unit shown in FIGS. 12 and 13 when the disc cartridge is placed in the cartridge receptacle.

When the disc cartridge 2 is not set on the base 10, the dustproof member 81 constructed as above is forced at the pivoting member 82 thereof by an elastic piece 92 engaged on the pivot limiter 91 to pivot about spindles 87 and 87 in the direction of arrow D in FIG. 14. Thus, the second portion 85 of the pivoting member 82 is turned toward the base 10, the first covering portion 85a covers the top of the drive shaft 34, and the second covering portion 89 fixed to the second portion 85 of the pivoting member 82 covers a lateral side of the drive shaft 34, whereby dust is blocked from adhering to the drive shaft 34. Also, the first portion 84 of the pivoting member 82 forming a predetermined angle with the second portion 85 is projected from the cartridge receptacle. When the disc cartridge 2 is not in the cartridge receptacle on the base 10, the cover member is pivoted upward in relation to the apparatus body with the cartridge insert/eject opening being uncovered. In this condition, foreign matter could not possibly enter from the cartridge insert/eject opening into the apparatus body. The dustproof member 81 in consideration is very effective to avoid invasion of such foreign matter into the apparatus body.

When the disc cartridge 2 is set in the cartridge receptacle on the base 10, the first portion 84 of the pivoting member 82 is pressed by a portion, near the write/read opening 4, of the lower half 2b of the disc cartridge 2. Then, the pivoting member 82 is pivoted about the spindles 87 in the direction of arrow D in FIG. 15. The second portion 85 forming the first covering portion 85a is pivoted in the direction of projecting from the cartridge receptacle on the base 10, and thus enters the cartridge body 2c through the write/read opening 4 in the lower half 2b. Thus, the second covering portion 89 will be apart from the drive shaft 34 and the optical pickup 8 installed to the fixing block 32 will smoothly be movable by the optical pickup feeding mechanism 31 radially along the magneto-optical disc 3.

Since the second covering portion 89 of the dustproof member 81 is not put into contact with the fixing block 32 when the disc cartridge 2 is set in the cartridge receptacle on the base 10, the optical pickup 8 can be fed with a high accuracy. Also, since when the disc cartridge 2 is not set in the cartridge receptacle, the first covering portion 85a will cover the top of the drive shaft 34 while the second covering portion 89 will cover the lateral side of the drive shaft 34, it is possible to positively prevent foreign matter from adhering to the drive shaft 34.

In the above embodiments, the optical pickup feeding mechanism 31 that feeds the optical pickup 8 and executes tracking control of the objective lens 14 and the objective lens drive mechanism for the optical pickup 8 is formed from the uniaxial actuator that provides only focusing control, but the present invention is not limited to this embodiment. The objective lens drive mechanism for the optical pickup 8 may be formed from a biaxial actuator as in the background mechanism to execute both focusing control and tracking control while the optical pickup 8 is fed by the optical pickup feeding mechanism 31.

Also, the aforementioned disc recorder/player 1 has the cartridge holder 11 installed pivotably on the base 10, but the disc recorder/player 1 may have a cartridge holder 11 that can move linearly toward and away from the base 10. Further, the disc recorder/player 1 can be incorporated in an installed type of apparatus.

As having been described in detail in the foregoing, the present invention provides a disc recorder/player using an electromechanical transducer as a drive source having a drive shaft installed thereon to move a write and/or read unit fixed on the drive shaft by expanding and contracting the drive shaft, and in which a dustproof cover unit is provided to prevent foreign matter such as dust or the like from adhering to the drive shaft when the recording medium is introduced or removed from the disc recorder/player, whereby it is possible to move the write and/or read unit with a high accuracy.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A recording and/or reproducing apparatus comprising:
   a loading unit configured to load a disc-shaped recording medium;
   a rotation drive unit configured to rotate said disc-shaped recording medium loaded in said loading unit, wherein said rotation drive unit is provided on a base;
   a recording and/or reproducing unit configured to record an information signal to said disc-shaped recording medium rotated by said rotation drive and/or reproduce the information signal from said disc-shaped recording medium; and
   a moving unit including:
      a drive shaft configured to support said recording and/or reproducing unit to be movable along a radial direction of said disc-shaped recording medium; and
      an electromechanical transducer provided at a first end of said drive shaft and configured to move said drive shaft along an axial direction of said drive shaft by expansion and contraction of said electromechanical transducer along said axial direction, said recording and/or reproducing unit being moved along said radial direction of said disc-shaped recording medium by moving said drive shaft along said axial direction; and
   a cover unit provided on said loading unit and configured to cover said drive shaft of said moving unit, wherein said cover unit is provided on a cover member separate from said base;
   wherein said cover unit includes:
   a first cover portion configured to cover a top of said drive shaft; and
   a second cover portion configured to cover a lateral side of said drive shaft at a side of said recording and/or reproducing unit, said second cover portion being substantially comb-shaped and elastically deformable,
   wherein said cover unit is provided on said base rotatably, and
   when said disc-shaped recording medium is unloaded in said loading position, said first cover portion covers the top of said drive shaft and a first part of said second cover portion is bent at the side of said first cover portion and a second part of said second member covers the lateral side of said drive shaft at the side of said recording and/or reproducing unit, and
   when said disc-shaped recording medium is loaded in said loading position, said cover unit is rotated by pushing said disc-shaped recording medium and said second cover portion is separated from said recording and/or reproducing unit.

* * * * *